(12) United States Patent
George

(10) Patent No.: US 6,223,342 B1
(45) Date of Patent: *Apr. 24, 2001

(54) OBJECT-ORIENTED SEQUENCING USING HIERARACHICAL CONFIGURATION STREAMS

(76) Inventor: A. Chacko George, 1200 Dale Ave. #79, Mountain View, CA (US) 94040

( * ) Notice: Subject to any disclaimer, the term of this patent is extended or adjusted under 35 U.S.C. 154(b) by 0 days.

This patent is subject to a terminal disclaimer.

(21) Appl. No.: 09/395,091

(22) Filed: Sep. 13, 1999

Related U.S. Application Data

(63) Continuation of application No. 08/743,884, filed on Nov. 6, 1996.

(51) Int. Cl.$^7$ .................................................... G06F 9/445
(52) U.S. Cl. ..................................... 717/10; 717/3; 717/9; 717/11
(58) Field of Search ................................ 717/10, 3, 9, 11

(56) References Cited

U.S. PATENT DOCUMENTS

| | | | |
|---|---|---|---|
| 5,202,981 | 4/1993 | Shackelford | 395/600 |
| 5,303,379 | 4/1994 | Khoyi et al. | 395/700 |
| 5,572,731 | 11/1996 | Morel et al. | 395/701 |
| 5,655,101 | 8/1997 | O'Farrell et al. | 395/475 |
| 5,687,365 | 11/1997 | Velissaropoulos et al. | 395/613 |
| 5,751,962 * | 5/1998 | Fanshier et al. | 709/223 |
| 5,758,153 | 5/1998 | Atsatt et al. | 395/614 |
| 5,822,580 | 10/1998 | Leung | 395/614 |
| 5,870,746 * | 2/1999 | Knutson et al. | 707/101 |
| 5,873,097 * | 2/1999 | Harris et al. | 707/203 |
| 5,970,496 * | 10/1999 | Katzenberger | 707/102 |
| 6,031,995 * | 2/2000 | George | 717/10 |
| 6,063,128 * | 5/2000 | Bentley et al. | 703/6 |
| 6,128,623 * | 10/2000 | Mattis et al. | 707/103 |

OTHER PUBLICATIONS

Schwan, "Topologies—Distributed Objects on Multicomputers", ACM Transactions on Computer Systems, vol. 8, No. 2, pp. 111–157, May 1990.*

* cited by examiner

Primary Examiner—Tariq R. Hafiz
Assistant Examiner—Ted T. Vo
(74) Attorney, Agent, or Firm—Terry McHugh

(57) ABSTRACT

A system and method for data processing objects having a number of attributes includes a sequence of object lists, each having data for identifying attribute values for at least one object. In a vector implementation, the object lists may be associated with a number of different objects. Each object list has a one-to-one correspondence between associated objects and local configuration steams that have configuration data indicative of the data structure for attributes of the object. In addition to the object lists, a global configuration stream is linked to form an object sequence. The global configuration stream includes configuration data indicative of the arrangement of the object lists. In a list implementation, each object list has linked smart pointers to locations in a memory pool that is used to store the attribute values. In the preferred embodiment, the object lists and/or the attribute smart pointers are indexed to increase traversal speed for enhanced performance.

13 Claims, 8 Drawing Sheets

OBJECT-ORIENTED SEQUENCING USING HIERARCHICAL CONFIGURATION STREAMS

CROSS REFERENCE TO RELATED APPLICATION

This is a continuation of copending application Ser. No. 08/743,884, filed Nov. 6, 1996.

TECHNICAL FIELD

The invention relates generally to systems and methods for data processing objects and more particularly to sequencing, accessing and manipulating objects of an object-oriented environment.

BACKGROUND ART

Within an object-oriented environment, objects are memory-resident elements in which data and functionality are merged. An object contains data of one or more data types (e.g., an integer, date, time and/or string) and contains methods, typically in the form of code, which define the useful operations of the object. Operations on the data of a particular object are triggered by reception of a message that identifies the desired function. For example, an object having an integer may receive a message that requires a step of multiplication with another integer. A message is received via an object interface.

An object in an object-oriented environment is characterized by its attributes, i.e., the count, types and values of the data. Each object tracks its own attributes. While some attribute values may be fixed, attributes are often variable.

As noted in U.S. Pat. No. 5,303,379 to Khoyi et al., objects are typically linked. That is, the data structures of the objects are interconnected. Linking allows dynamic copying of data or information from one data structure to another, so that the destination data structure is provided with the most recent version of the data residing in the source data structure. A link is defined in the Khoyi et al. patent as a means by which one object (a "child object") is connected to another object (a "parent object"). The data of the parent and child objects may be linked dynamically or statically. For dynamic linking, the data are read from the child object and provided to the parent object each time that the link is updated. This updating feature is distinguishable from the copying feature. A static link is one in which updating of one of the objects does not affect data in the other object.

An object-oriented environment also includes other types of links. As previously noted, each object tracks its own attributes. However, "classes" of objects possess similar attributes. The objects of a single class possess the same methods and the same data types and respond to the same messages, but are distinguishable from each other by the attribute values. Classes may be organized into a hierarchy of superclasses and subclasses, with a subclass inheriting the messages and methods of its superclass. In addition to the inherited messages and methods, objects of the subclass may include subclass-specific messages and methods.

One advantage of the object-oriented environment is the inherency feature. Inherency permits a program or programmer to take advantage of the commonality of objects in the manipulation of the objects. Another advantage of the environment is that it permits "polymorphism," i.e. the ability of an object to assume different forms of the object. While inheritance relates to slightly different data structure or behavior of objects in a single class, polymorphism relates to differences in data structure that lead to an object being in a derived class. Thus, polymorphism allows the same operation to behave differently within different classes. Other advantages of an object-oriented environment include faster program development and easier maintenance.

While conventional object-oriented environments provide clear advantages over other program environments, further improvements relating to specific capabilities are sought. For example, object-sharing among different programs on a single computer would allow users to further exploit the power of object-oriented programs and would decrease development time. Preferably, this object integration across program boundaries would also allow objects to be packaged and transported across a network. Another desired improvement relates to the sort and search utilities for objects. The conventional object-oriented programs perform well in sorting and searching through objects of a particular class, since these algorithms are generally provided along with the class. The desired mechanism would be to provide a general sort and search utility that would perform these operations on objects of different types without having to provide specific algorithms based on the type. Preferably, the utility should accept various attribute sort orders to sort the object in different ways.

Another concern in conventional object-oriented environments is that traversing links reduces operational speed. For example, if 1000 objects are linked and a messages requires access to entry 495 from entry 1, one-to-one linkages require 494 steps to access the selected object.

What is needed is a system and method for data processing objects such that the advantages and the power of object-oriented environments are enhanced. Also needed is such a system and method in which the speed of link traversals is increased.

SUMMARY OF THE INVENTION

A system and method for data processing objects in which each object (whether a singleton, a sequence of objects, or a higher order sequence of objects) is structurally implemented with a linked list mechanism, and is hereafter termed an "object list." The linked list type can be singularly or doubly linked. However, the doubly linked list approach is treated here. In this approach, the system and method include forming a sequence of object lists in which each object list has separate links to immediately preceding and immediately following object lists in the sequence. The links form a sequential arrangement. A global configuration stream stores configuration data regarding the sequential arrangement. Preferably, the global configuration stream includes a count of attributes of the object, the order of the sequence, and the individual attribute details, such as data types (integer, date, etc.) and data widths. Additionally, the global configuration stream has settings to determine whether the list is the primary owner of the underlying memory pool and whether the implementation is a list or vector implementation. In addition to the global configuration stream, there is at least one local configuration stream for each of the object lists. In the preferred embodiment, there is a one-to-one correspondence between the local configuration streams and objects associated with the sequence. The local configuration stream includes configuration data indicative of the data structure of a specific object associated with a specific object list. For example, the local configuration stream of a specific object list that represents a single object may include the attribute count and whether individual attributes are present, touched or cleared.

In a "list implementation" of the system and method, each object list is a sequence of smart pointers to a memory pool. Each smart pointer in the sequence identifies a particular memory pool and an offset location within the identified memory pool. Using a polymorphic expression of the program language, the memory space that is identified can be interpreted as one of a variety of different attribute types, such as a date, an integer, a string or an object list itself. The smart pointers and the local configuration stream of the object list reside in the same memory pool, and the properties of a smart pointer are the index of the memory pool and the offset within the memory pool (i.e., the location of an attribute value within linear memory space). For an object having three attributes, such as a date, an integer and a string, an object list includes the associated local configuration stream and three smart pointers to memory locations of the values for the three attributes. The object list and the local configuration stream are also smart pointers. Within a sequence of object lists, some of the objects will be "sparse," i.e. some of the objects will have one or more absent attributes. If a user requests a date, the associated local configuration stream is checked to first determine the presence of the date. If the local configuration stream identifies the date as being absent, it is known that the date attribute is nonexistent. In another example, if the user requests the string and the local configuration stream shows that both the date and integer attributes are absent and the string attribute is present, it is known that the first smart pointer after the local configuration stream smart pointer in the associated sequence of smart pointers locates the memory pool and offset for the string attribute.

In this list implementation, a single object list may be considered an object sequence of Order Zero. When this singleton is linked into a sequential arrangement as defined above, the resulting sequence may be referred to as an object sequence of Order One. If more than one object sequence is linked, an object sequence of Order Two is formed. Of course, further orders are possible. Each object sequence of order greater than Zero includes its own global configuration stream.

In a "vector implementation" or "array implementation" of the system and method, each object list includes at least one local configuration stream and includes a contiguous segment of memory pool in which attribute values are stored. Typically, an object sequence of Order One includes memory space of attribute values for more than one object, with each object being associated with a separate local configuration stream. The attribute values will be arranged in rows in which each row contains attribute values for a different object in the sequence. In the same manner as the list implementation, these vector row aggregates of the vector implementation are linked in the manner described above to provide an object sequence of Order One. Two or more Order One object sequences may be linked to form an object sequence of Order Two, which is in turn linked with one or more other Order Two object sequences to form an object sequence of Order Three. Each object sequence of order greater than Zero has a sequence-specific global configuration stream.

In the preferred embodiment, the objects of the different object lists of a sequence are also interlinked by a smart list mechanism that reduces the requirements of sequence traversal. Because the object lists are linked to immediately preceding and immediately following object lists, a random traversal of a sequence requires that several object lists be accessed. This reduces the speed of data processing if the sequence includes a large number of entries, e.g., more than 1000 object lists. The smart list mechanism may be considered a parallel sequence of indexing nodes that enable incremental skips through the sequence of object lists. For example, if a message requires access to object list 495 and the second sequence includes indexing nodes and objects that enable incremental jumps of twenty-five, the incremental jumps will occur until the appropriate indexing node provides a move to object list 500 in the first sequence, after which five backtrack moves provide access to the selected object list 495. Preferably, this indexing approach is user manipulable, so that the increments of the second sequence of indexing nodes is user configurable. Also in the preferred embodiment, the smart list mechanism includes one or more additional smart list sequences that provide jumps through the immediately preceding smart list sequence. Continuing with the example, if the second sequence is configured to provide jumps of twenty-five elements, the third sequence may be configured by jumps of 25, so that there are jumps of 625 (i.e., $25^2$) relative to the original object list. Of course, additional sequences of indexing nodes may be added if the number of object lists in the original sequence warrants. This indexing approach also applies to object lists having a large number of attributes that require an extended linked list of smart pointers to memory space, so that indexing sequences provide incremental jumps of nodes of the attribute smart pointers.

An optional feature of the system and method relates to time-stamping. As previously noted, smart pointers of an individual object list may identify a memory pool index and an offset into the specified memory pool to access one attribute value of a particular object. However, it is common to retire objects once the objects have temporarily served their intended purposes. The retirement of an object does not destroy the object, but only releases its contents with the possibility of the object being revived again. In the present invention, retirement of an object list creates "dangling" smart pointers to memory space. The concern with dangling pointer references may be alleviated by date and time stamping the memory pool when it is created for the first time or revived after being retired. When smart pointers are referenced into the memory pool, the date-time stamp of the memory pool is copied to the smart pointer. When the value of the smart pointer is subsequently sought, the date stamps of the relevant smart pointer and the specified memory pool may be compared to determine whether the smart pointer is still a valid one. Another approach to the problem is to provide a special memory pool type that is subclassed off the memory pool. This subclassed type redefines all memory control operations in order to raise exceptions. When a memory pool is retired, after releasing its contents it is downgraded to this sub-type. Therefore, any subsequent smart pointer accesses into this downgraded pool will cause exceptions to be raised.

An advantage of the invention is that the power of a sort utility and a search utility is enhanced. The sequences of object lists may include objects of different classes and subclasses. Moreover, a combined sort-and-search utility provides benefits. This utility accepts a designated object sequence of Order One and a sorting order command. The global configuration stream facilitates the sorting by supplying the utility with the data types and widths for the objects attributes. The local configuration stream facilitates the sorting by supplying the utility with attribute presence settings. Once an object of sequence Order One is sorted, any number of searches for objects with specified attribute values can be conducted. The objects are sorted according to a specified ascending or descending order of attributes. By using this external sort mechanism, an object can be sorted based upon different source attributes without changing the original object. An alternative sort-and-search mechanism uses an internal sort in which the object is sorted in place. Thus, when the object is added or "touched," this mechanism automatically resorts the sequence to provide an up-to-date sorted sequence.

Another advantage of the invention is that object sequences of Orders Zero, One or Two may be accepted within an object stream device that streams the objects into memory reservoirs or spaces. This streaming can be selective, such as specifying only a subset of the attributes or specifying only certain objects. The global and local configuration streams facilitate the manipulation, so that execution occurs accurately and within a reasonable time period. In the reverse of the streaming, a memory reservoir can be specified and then streamed to reconstruct an object in memory. Another advantage is that object sequences of Order One can be readily displayed in a spreadsheet-like graphical user interface table. The table can provide full data validation capability, so that only attribute entries compatible with the attribute type are accepted. Further, only attributes that are enabled will be allowed user-input values. Another advantage is that the objects are packaged to be shared among processes running on a single computer, so that program boundaries are traversed. Alternatively, the objects can be packaged to be transported across a network.

Finally, the invention provides a facility to store an object in a repository. Thus, the object has persistence beyond the life of the program that created and populated the object. Query mechanisms are offered to selectively extract objects from the repository and to update the state of the object in the repository. Again, the configuration streams facilitate the query and update mechanisms. This repository may contain objects of unrelated types and classes.

BEST MODE FOR CARRYING OUT THE INVENTION

Figure 1:
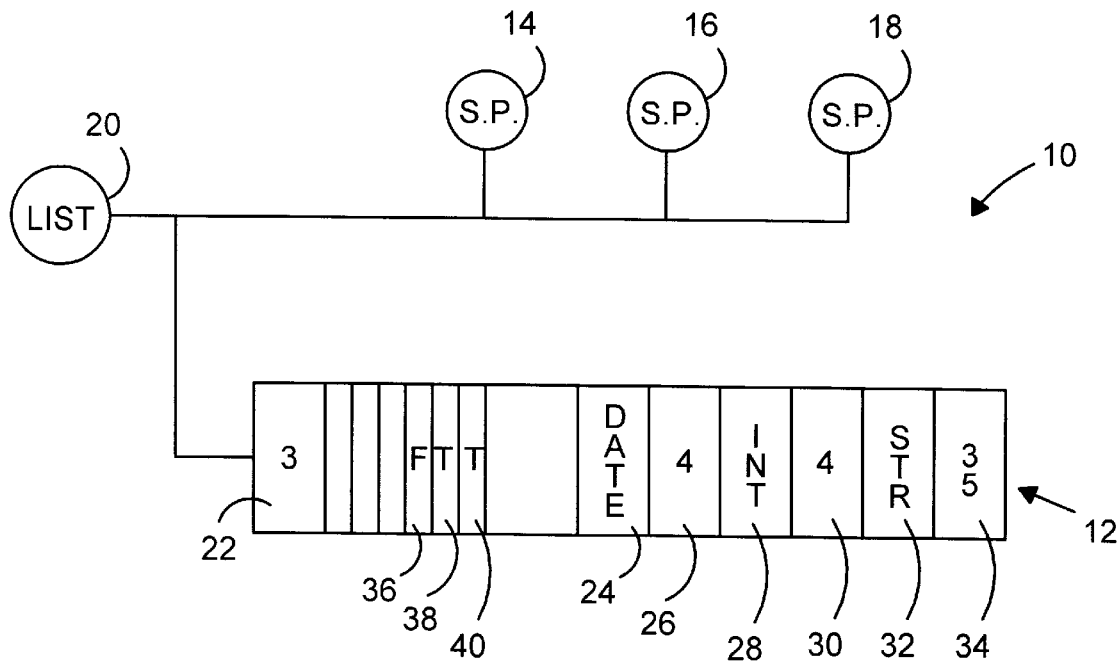
FIG. 1 is a schematical representation of an object sequence of Order Zero, also referred to as a singleton, in accordance with a list implementation of the invention.

With reference to FIG. 1, an object list 10 of Order Zero is shown as having a local configuration stream 12 and a list of three smart pointers 14, 16 and 18. The object list has a list element 20 that can be used to store link information to other object lists to form an object sequence of Order One, as will be explained more fully below.

The local configuration stream 12 is specific to the object list 10. While not shown in FIG. 1, the configuration stream is a smart pointer. A first segment 22 of the stream identifies the attribute count of the object formed by the object list. In FIG. 1, the attribute count is "3." Each one of the smart pointers 14, 16 and 18 is associated with a different attribute of the object. Segment 24 identifies the first attribute as being indicative of a date, while the adjacent segment 26 identifies the width of the date attribute in linear memory space. The adjacent two segments 28 and 30 relate to the second attribute. In FIG. 1, the second attribute is an integer having a width of four bytes. The third attribute of the object has a type identified in segment 32 and a width identified in segment 34. The third attribute is a string, such as a text string, having a width of 35 bytes. While the segments 24, 28 and 32 that identify the attribute types are shown as including text, typically the identification of the attribute type is code.

If the object is held in a repository, the local configuration stream 12 includes the major and minor number of the object. Other segments identify whether a particular attribute has been touched (has a set value), has been cleared (has an unset value), is currently present (because the object is sparse), and whether the attribute is enabled for input by a user. For example, the designation may be set in segment 36 to "false" to indicate that the first attribute will not be user variable. The "true" designation in segment 38 may indicate that the first attribute is present, and the "true" designation in segment 40 may indicate that the attribute has been touched.

Figure 2:
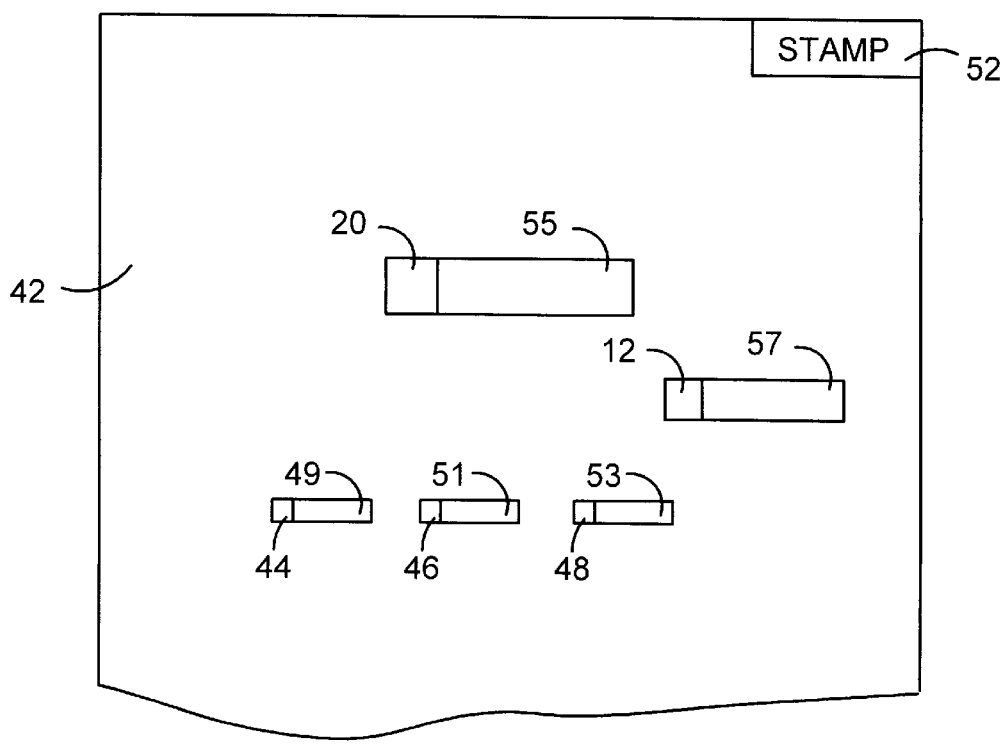
FIG. 2 is a schematical representation of a memory pool having attribute values for the singleton of FIG. 1.

The three smart pointers 14, 16 and 18 of the object list 10 contain identifications of memory space for the three attributes of the object. FIG. 2 is a portion of a memory pool 42 of objects and their attribute values. The list element 20 of smart pointers 14, 16 and 18 and the local configuration stream 12 is shown as being stored in the memory pool 42. The properties of each smart pointer are the memory pool index and the offset into the specified memory pool. For example, the smart pointer 14 may identify the memory pool 42 and identify space 44 that contains the date attribute. The second smart pointer 16 also indexes the memory pool 42, but identifies the space 46 as the location that stores the integer which is the second attribute. The third smart pointer 18 identifies the space 48 in memory pool 42 as the location of the 35-byte string of the third attribute. Since the locations of attribute values in the memory pool are typically random, each of the three identified spaces 44, 46 and 48 is associated with a node 49, 51 and 53 of object list 20. Additionally, the local configuration stream 12 is associated with node 57 of list 20. If list 20 were a part of another list, as will be explained more fully below, its node would be 55.

The object represented by FIGS. 1 and 2 has all three of the attributes "present." However, objects in the same object sequence may have one or more absent attributes. The local configuration stream 12 contains the data necessary for properly accessing the attributes in such sparse objects. If a user requests a date, the local configuration stream of the object is used to determine whether the date attribute is present. If the local configuration stream notes that the date attribute is absent, it is known that the date attribute value is nonexistent. As another example, if the user requests the string attribute from an object having absent date and integer attributes, the local configuration stream will have a first "present" indication in the stream segment associated with the string attribute. It is therefore known that the smart pointer associated with the string attribute will be the first smart pointer after the smart pointer that contains the local configuration stream. The "present" indicator for an attribute is set when the attribute value is set.

A concern in the use of the smart pointers 14, 16 and 18 to identify the location of attribute values in memory space is that object lists are often retired after serving an intended purpose. That is, the underlying memory pool space is shrunk to a size of zero. Subsequently, the object may be revived. In this case, the smart pointers which were referencing the state of the memory pool prior to the retirement of the pool will be dangling or invalid. However, in the preferrred embodiment, each smart pointer has a time stamp value which is copied from the time stamp segment of the memory pool when the smart pointer is set to reference an offset into the memory pool. Each time that one of the smart pointers is subsequently used to access stored information regarding an attribute value, a comparison is made between the time stamp of the smart pointer and the time stamp of segment 52. If the time designated at the memory pool stamp segment 52 is not equal to the time stamp of the smart pointer, the information contained in the value identified by the smart pointer is treated as invalid. On the other hand, if the dates match, the attribute values are accessed. It is noted that rather than providing the time stamping, the problem of dangling or invalid smart pointers may be addressed by subclassing special memory pool types from the totality of the memory pool, with the subclasses redefining all memory control operations to raise flags when attribute values are no longer valid.

Figure 3:
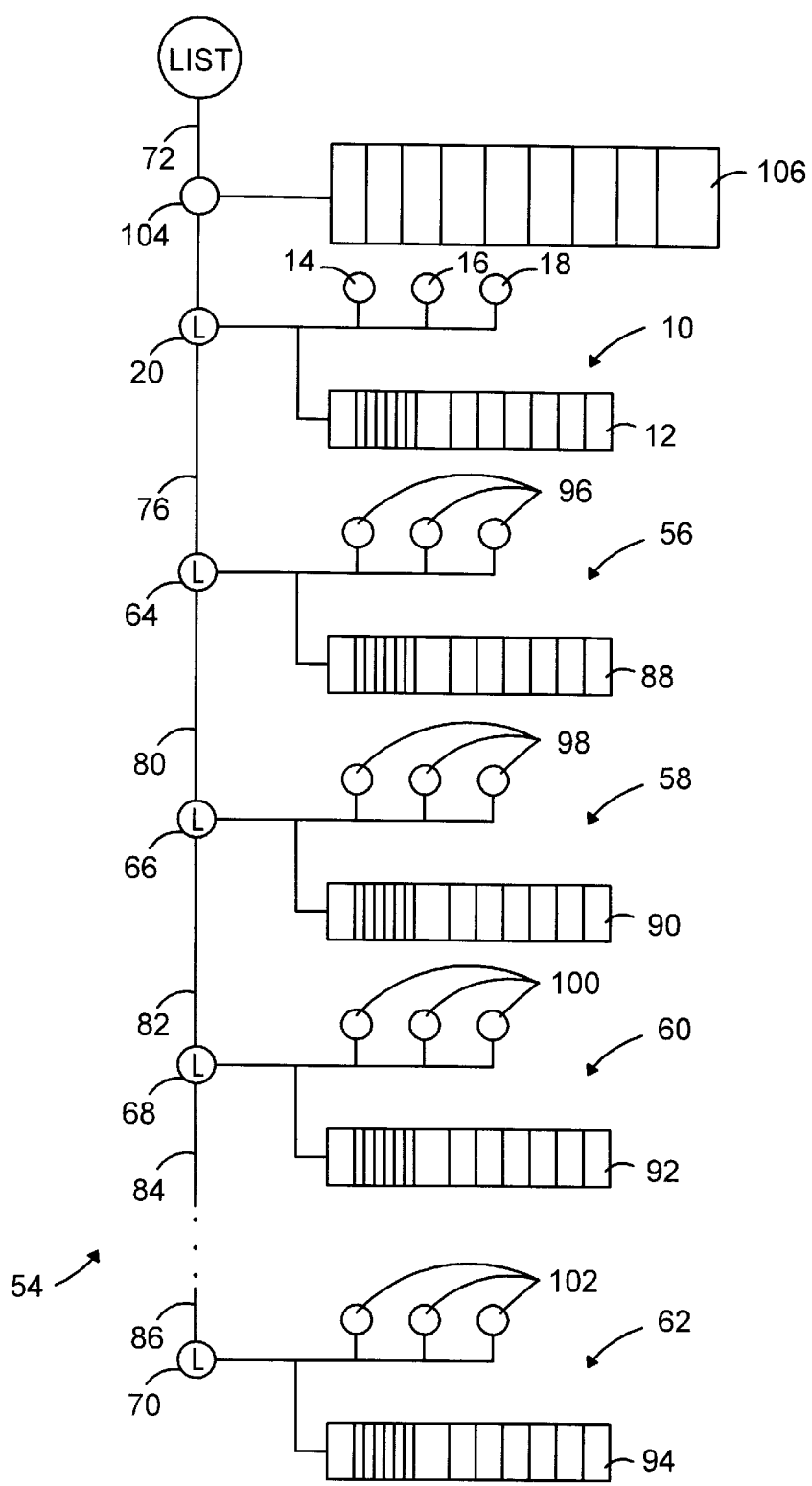
FIG. 3 is a schematical representation of an object sequence of Order One, including the singleton of FIG. 1 within a list implementation.

Referring now to FIG. 3, the object list 10 is shown as being linked with a number of other object lists 56, 58, 60 and 62 to form an object sequence 54 of Order One. Each of the object lists includes a list element 20, 64, 66, 68 and 70. The list elements include entry information and each includes a link to an immediately preceding list element and a link to an immediately following link element. Lines 72, 76, 80, 82 and 84 represent the links that form the sequence 54.

For each of the list elements 20 and 64–70, there is a local configuration stream 12, 88, 90, 92 and 94 and a group of smart pointers 14–18, 96, 98, 100 and 102 that identify linear space in a memory pool, as described with reference to the smart pointers 14, 16 and 18. Each of the object lists 10, 56, 58, 60 and 62 is shown as having three smart pointers.

In addition to the object lists 20, 64, 66, 68 and 70, the sequence 54 includes an element 104 for a global configuration stream 106. In the same manner as the local configuration streams, the global configuration stream is a sequence interpreted as bits and bytes and/or integers. The global configuration stream is segmented to include information regarding the object sequence 54. For example, the global configuration stream identifies the sequence as an object sequence of Order One, identifies the object's attribute types, the object's attribute count, and whether the sequence utilizes the list implementation or the vector implementation of the invention. In FIG. 3, the list implementation is illustrated.

Figure 4:
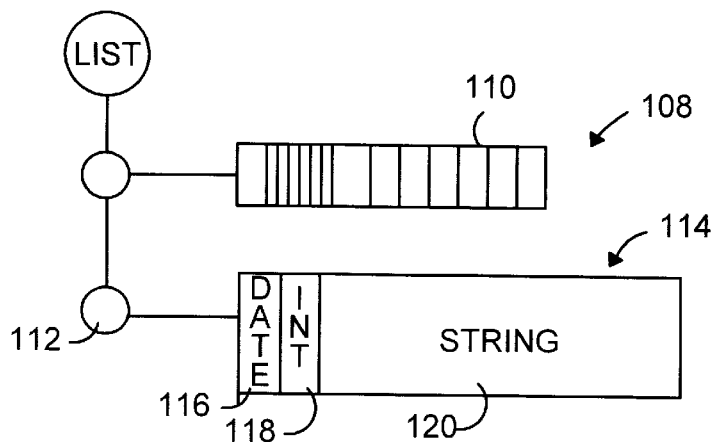
FIG. 4 is a schematical representation of an object sequence of Order Zero in accordance with a vector implementation of the invention.

Referring now to FIG. 4, the vector implementation of a singleton is shown. The object list 108 is a vector row that is the equivalent of the object list 10 of FIG. 1. Thus, the object sequence of Order Zero has a local configuration stream 110 and represents an object having three attributes. The salient difference is that rather than a one-to-one correspondence of smart pointers to attributes, the object list 108 has a single smart pointer for the attributes. The object list includes an element 112 of linear memory space 114. The memory space has three segments, 116, 118 and 120 that are functional equivalents of the memory spaces 44, 46 and 48 of FIG. 2. The local configuration stream 110 preferably contains all of the object information described with reference to the local configuration stream 12 of FIG. 1. Thus, the attribute counts, the attribute types and widths, and data relating to whether attributes are sparse, touched or cleared are contained within the local configuration stream 110. In addition, individual attribute offsets from the start of linear memory space 112 are included in this configuration stream.

Figure 5:
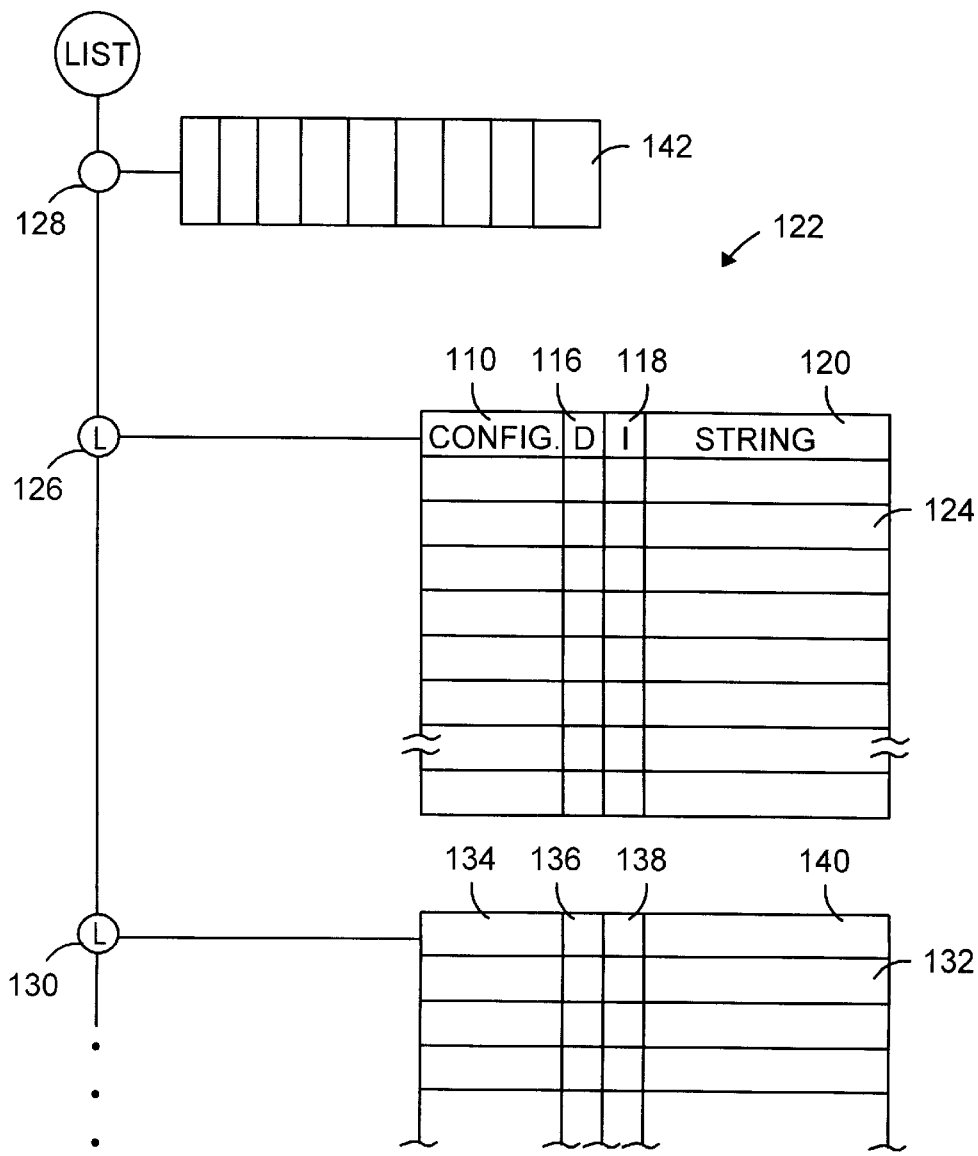
FIG. 5 is a schematical representation of an object sequence of Order One, including the vector object sequence of FIG. 4.

An object sequence of Order One according to the vector implementation is shown in FIG. 5. The object sequence 122 has a vector row aggregate 124 that includes the local configuration stream 110 and the attribute values 116, 118 and 120 described with reference to FIG. 4. The vector row aggregate has a number of contiguous rows, with each row representing a different object. Each row has a dedicated local configuration stream and three memory spaces for attribute values. While not critical, some of the objects will include sparse attributes. While the example shows a sequence of objects having three attributes, these vector row aggregates could be of any number of attributes. The local configuration streams 110 operate to identify "absent" attributes of sparse objects in the same manner as described above with reference to the list implementation.

In addition to the list element 126, the Order One sequence 122 includes a configuration element 128 and a second list element 130. The second list element includes entry information and links to the preceding element 126 and the immediately following element, not shown. A second vector row aggregate 132 is formed of rows and columns. The rows represent individual objects. The first column 134 stores the local configuration streams and the remaining three columns 136, 138 and 140 contain attribute values. A global configuration stream 142 is generally identical to the global configuration stream 106 of FIG. 3, as far as attribute types and widths and present, cleared, and enabled settings go. In addition, the global configuration stream 142 identifies the number of used object rows, identifies the number of rows in each vector row aggregate 124 and 132, and includes any other relevant data for computing how to access a particular attribute within a specific row of one of the row aggregates.

Figure 6A:
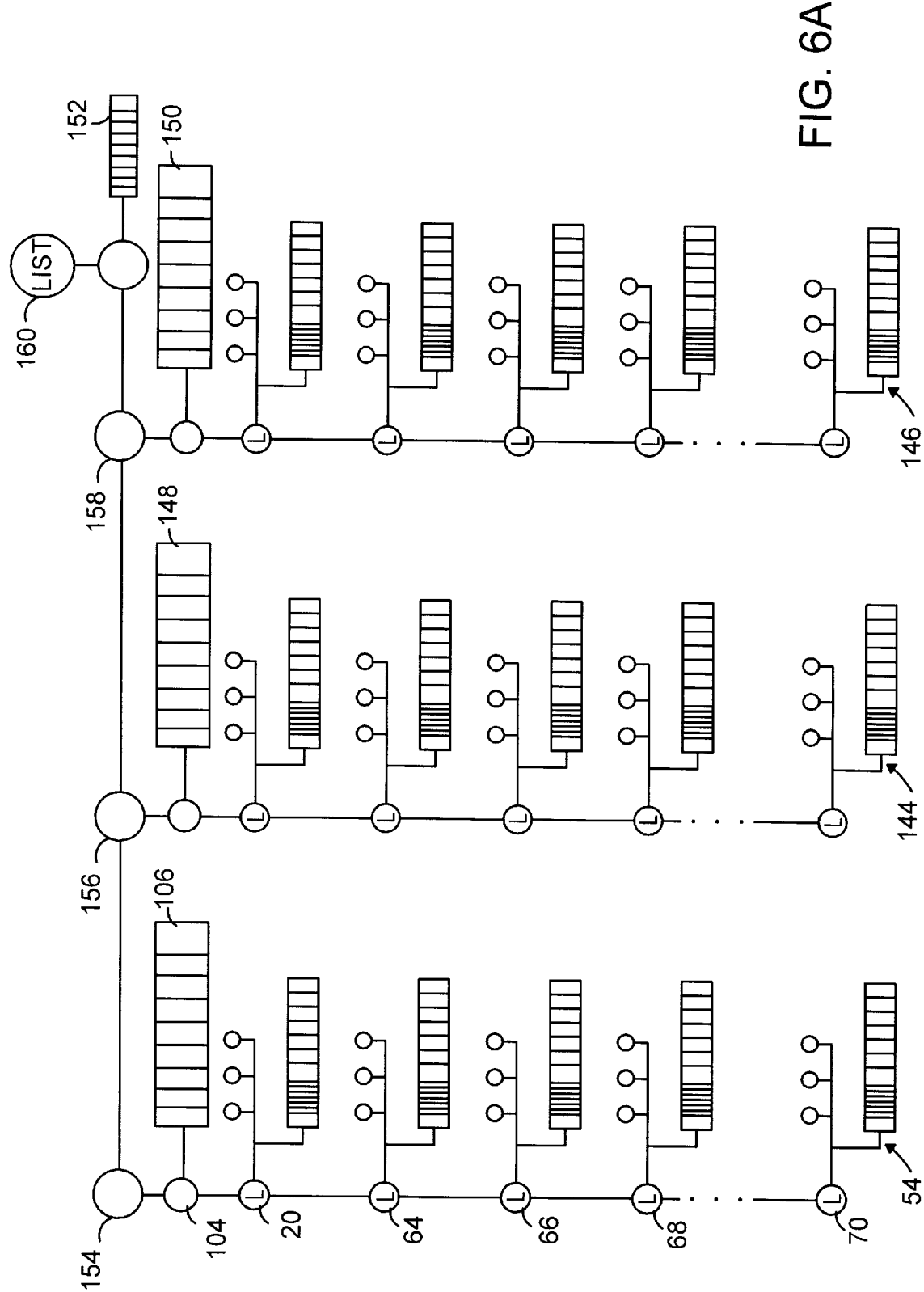
FIG. 6A is a schematical representation of a list implementation of an object sequence of Order Two, including the object sequence of FIG. 3.

Returning to the list implementation of the invention, FIG. 6A illustrates an object sequence of Order Two. The Order Two sequence includes the Order One sequence 54 of FIG. 3 and two additional Order One sequences 144 and 146. Each of the linked object sequences 54, 144 and 146 includes its own global configuration stream 106, 148 and 150. Each of these global configuration streams is dedicated to the associated Order One sequence. A universal configuration stream 152 is employed to contain configuration data relating to all of the Order One sequences. The configuration streams are substantially duplications of each other in many instances. The object sequences are linked by list elements 154, 156 and 158 in the same manner that FIG. 3 illustrates linking of the individual object lists 10, 56, 58, 60 and 62. Thus, links are formed to immediately preceding and immediately following list elements of different Order One sequences. While only three object sequences 54, 144 and 146 are shown in FIG. 6A, additional object sequences may be linked in the same manner as illustrated.

The Order Two object sequence of FIG. 6A includes a main list element 160. By linking this main list element 160 to one or more other main list elements of other Order Two object sequences, an object sequence of Order Three is formed. Preferably each Order Two sequence is associated with a separate universal configuration stream 152, and the Order Three sequence has a dedicated configuration stream having configuration data indicative of the linked Order Two sequences.

Figure 6B:
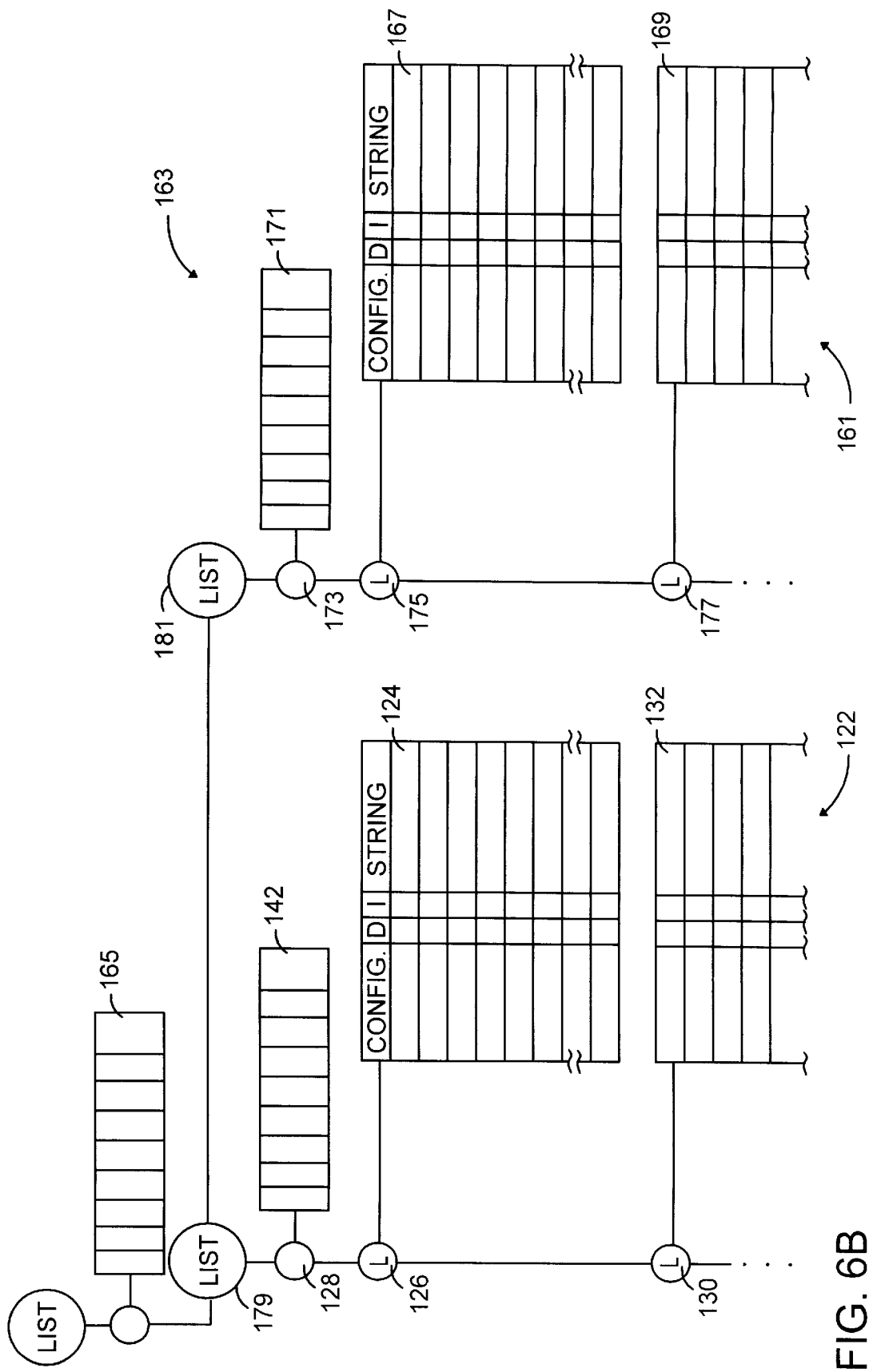
FIG. 6B is a schematical representation of a vector implementation of an object sequence of Order Two, including the object sequence of FIG. 5.

In FIG. 6B, the Order One object vector sequence 122 in FIG. 5 is linked to another Order One sequence 161 to form an object sequence of Order Two 163. Both of the Order One sequences 122 and 161 have at least two vector row aggregates 124, 132, 167 and 169 and have a global configuration stream 142 and 171. Within the second Order One object sequence 161, list elements 173, 175 and 177 are equivalent to the list elements 128, 126 and 130 that were described with reference to FIG. 5. Linked elements 179 and 181 of the two Order One object sequences 122 and 161 are elements of a main list element 183. As in FIG. 6A, the Order Two sequence 163 of FIG. 6B has a universal configuration stream 165 which includes configuration data for the higher level object sequence. Order Three object sequences can be formed as described above with reference to FIG. 6B.

Figure 7:
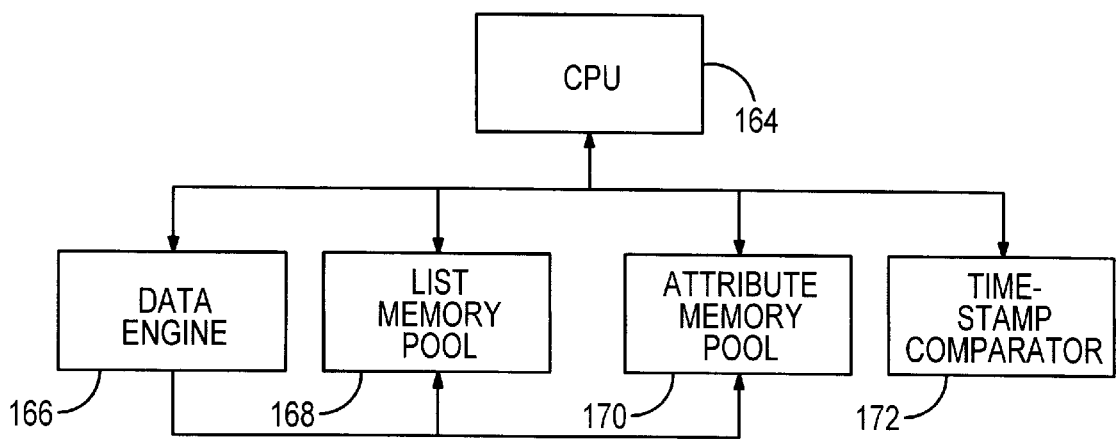
FIG. 7 is a block diagram of a system for data processing the object lists and sequences of FIGS. 1–6.

While the operations of the invention take place primarily in computer software, the operational components are shown schematically in FIG. 7. A central processing unit (CPU) 164 controls operation of a data engine 166, a list memory pool 168, an attribute memory pool 170 and a time-stamp comparator 172. While the two memory pools 168 and 170 are shown as separate components, the two pools are preferably combined. Upon creation of an object, the object must be fully identified to the data engine 166. As described above, the first element of a list is reserved for the configuration information of the object. The configuration information is a stream interpreted as bits, bytes and integers. Key information of a configuration stream includes the attribute count, the order of the sequence, the attribute types and whether the attributes are currently present, touched or cleared. Object sequences are stored in the list memory pool 168.

The attribute values may be stored in the memory pool 170. Thus, the smart pointers of the list implementation have the properties of memory pool identification and the offset in linear memory space within the identified memory pool. In FIG. 7, the smart pointers of the objects within the list memory pool identify locations within the attribute memory pool 170 at which the appropriate attribute values are stored.

The time-stamp comparator 172 is an optional component that is used in the manner described with reference to FIGS. 1 and 2. Each attribute smart pointer 14, 16 and 18 includes a time stamp. When a memory pool 42 is formed, either created or revived, it is birth dated at the time-stamp segment 52 within the memory pool. Adding new objects will cause the memory pool to grow. As smart pointers are first referenced to the memory pool, each smart pointer copies the birth date of the reference memory pool. When one of the smart pointers 14, 16 or 18 is subsequently accessed to acquire an attribute value from the appropriate memory space 44, 46 and 48, the stamp comparator 172 is used as a safeguard to reduce the likelihood that invalid attribute values will be accessed. If the object list 10 has been retired and then later revived, the time-stamp at the segment 52 of the memory pool will be later than the time indicated at the time-stamp of the attribute smart pointer. In such case, the data within the linear memory space 44, 46 and 48 are not accessed.

A concern in the use of object lists having a large number of smart pointers identifying locations of attribute values is that the time of traversal from a first smart pointer to a midpoint smart pointer may adversely affect operation. The same concern applies to object sequences having a large number of object lists. While not shown in FIG. 1, the smart pointers 14, 16 and 18 may be doubly linked in the same manner as the object lists 20, 64, 66, 68 and 70.

Figure 8:
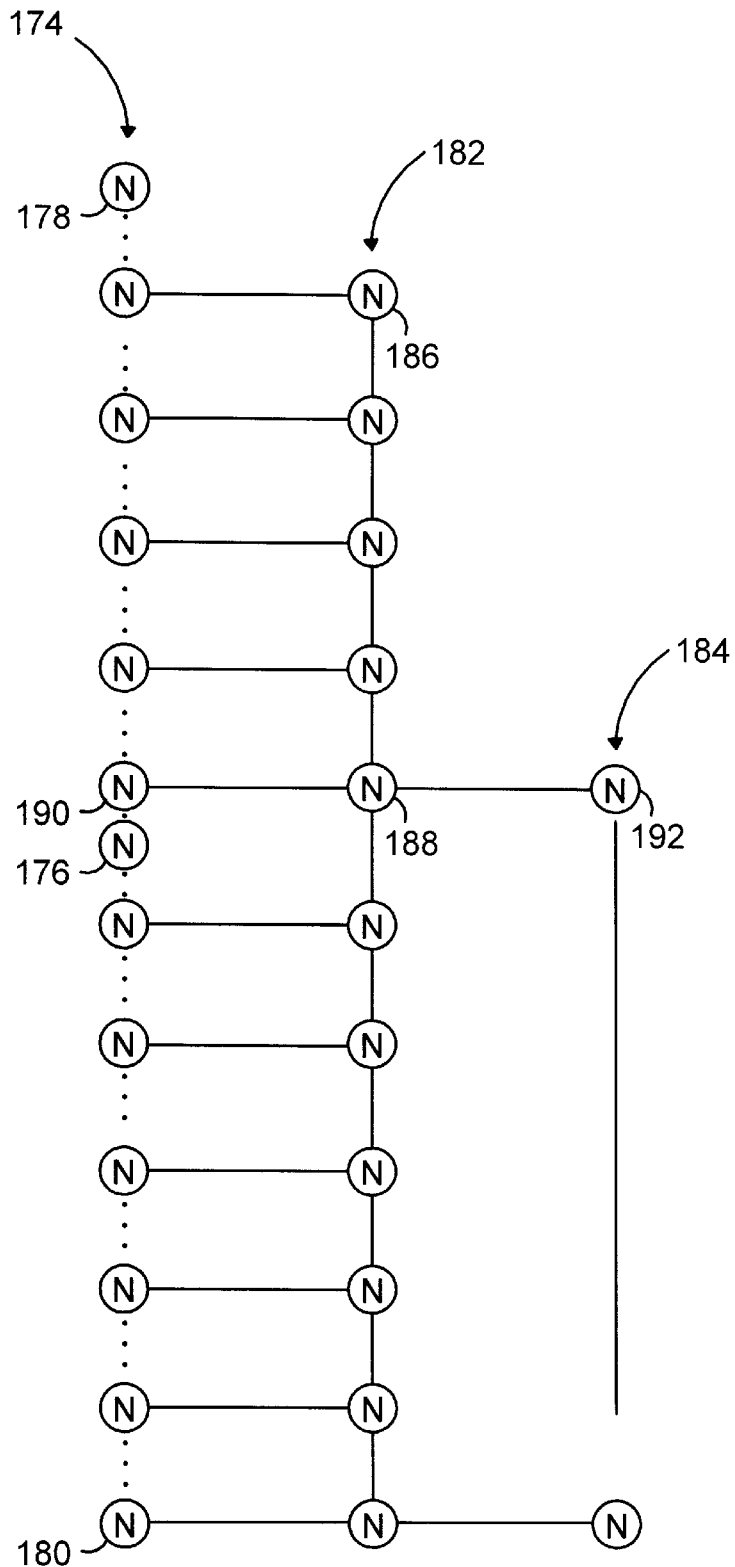
FIG. 8 is a schematical representation of an indexing approach for data processing the object lists and sequences of FIGS. 1–6.

A linked list has the advantage of facilitating deletions and insertions of elements in the lists, since the operation is as simple as unlinking the deleted item and linking in a new element. Because the list of smart pointers or object lists is doubly linked, the list can be traversed from the top downward or from the bottom upward. FIG. 8 represents a doubly linked list 174 of nodes. Only every fifth node is shown, other than the twenty-sixth node 176. Within the list 174, each node is linked to the immediately preceding and immediately following element in the list. The first node 178 in the list does not have a preceding node, and the last node 180 does not have a next node.

Traversal in the doubly linked list 174 is carried out by accessing nodes along the path through the list to determine where in memory the next node in the same direction is to be found. Thus, the procedure is one of stepping through the list until the destination node is reached. In the doubly linked list 174, there are two ways to reach element 176, i.e. the twenty-sixth list element, without leaving the list 174. From the top of the list twenty-five moves may be made to node 176. Alternatively, twenty-eight moves may be made from the end-of-list node 180, i.e. the fifty-fifth list entry, to the node 176. These are potentially expensive operations when large list numbers are involved.

One means of alleviating the list traversal problem is to provide one or more indexed lists 182 and 184 of nodes that include stored addresses of nodes in the preceding list, stored addresses of nodes of 174 in 182, and stored addresses of 182 in 184. In FIG. 8, each node in the indexed sequence 182 stores an address of a fifth node in the primary list 174. Likewise, each node in the second indexing list 184 stores an address of a fifth node in the first indexing list 182. Thus, the first indexing list 182 indexes the primary list 174 of nodes, while the second indexing list 184 indexes the first indexing list 182.

If the determination is made to access node 176, computation is executed to determine the most efficient method. As one alternative, node 178 may be used as a starting point and twenty-five downward moves are made to node 176. As a second alternative, the top-of-list node 186 may be used as a starting point and four downward moves are made to indexing node 188 having a smart pointer to the twenty-fifth node 190 of the primary list 174. From node 190, one downward move is made to the designation node, i.e. the twenty-sixth node 176. As a third alternative, the top-of-list node 192 in the second indexing sequence 184 may be accessed to acquire the address of the node 188 of the first indexing sequence 182, after which node 190 is accessed and one downward move is made to the destination node 176. This third alternative provides the most efficient path to the destination node and is therefore utilized.

The illustrated indexing method and system of FIG. 8 does not adequately demonstrate available time savings. When the pyramid structure is used in actual practice, the doubly linked list 174 may include more than 1000 entries.

Assuming that the first indexing sequence 182 of indexing nodes provides steps of ten elements and the second indexing sequence 184 also includes steps of ten as counted relative to the first indexing sequence list, the moves to traverse from entry number 5 in the doubly linked list 174 to entry number 495 is significantly reduced. While the illustration deals with a doubly linked list, this technique can be applied to a singularly linked list as well.

Preferably, the intervals for the indexing nodes in the indexing sequences 182 and 184 are user configurable. Returning briefly to FIG. 7, the CPU 164 is controlled in software to build the indexing lists that are operationally linked with the doubly linked list 174 of attribute smart pointers or object lists. The embodiment of FIG. 8 provides fast random access to the nodes of the list, but list updates by insertions and/or deletions create management problems.

The arrays of FIG. 5 are an alternative mechanism to the doubly linked lists of attribute smart pointers. Arrays are continuous memory space that contain a vector of component data types. Thus, a single element comprising several basic data types may have a size of 25 bytes, so that ten elements of the same size will occupy 250 bytes. Arrays provide much faster access compared to doubly linked lists, since array access is merely size arithmetic. In the above example, if the third attribute has an offset of 8 bytes from the starting address of the element, the third attribute of the sixth element is located at an offset of 133 (25×5+8=133) from the start of the array. However, array maintenance, additions and deletions are more costly than doubly linked lists. If an element is deleted from an array, all of the following elements must be moved up to cover the unused memory space. Likewise, if an element is inserted in the middle of an array, the following elements must be "pushed" downwardly to accommodate the incoming element.

An advantage of the invention is that the smart pointers utilized in the structures above allow a hybrid of the doubly linked list in the vector implementations. The resultant is a list of arrays, shown in FIG. 5, to harness the power of both approaches, i.e. the fast access of the arrays and the easier maintenance of the lists. The size of the row in a vector is determined at the start and the configurable parameter indicates the number of rows in each array. Thus, if the size of the row is 25 bytes and the user specifies an array size of ten rows per array, there will be a total of 1000 rows and the resultant will be a list of 100 rows of ten elements. The step mechanism of FIG. 8 can be used to provide further improvements in access times. The selection of the array size should consider the performance and the maintenance of the list. If the array size is 1, as shown in FIG. 4, then maintenance of the list will be facilitated, but the access time through a large number of such lists will reduce performance. On the other hand, if the array size is large, the access speed is enhanced, but the maintenance becomes more difficult.

Figure 9:
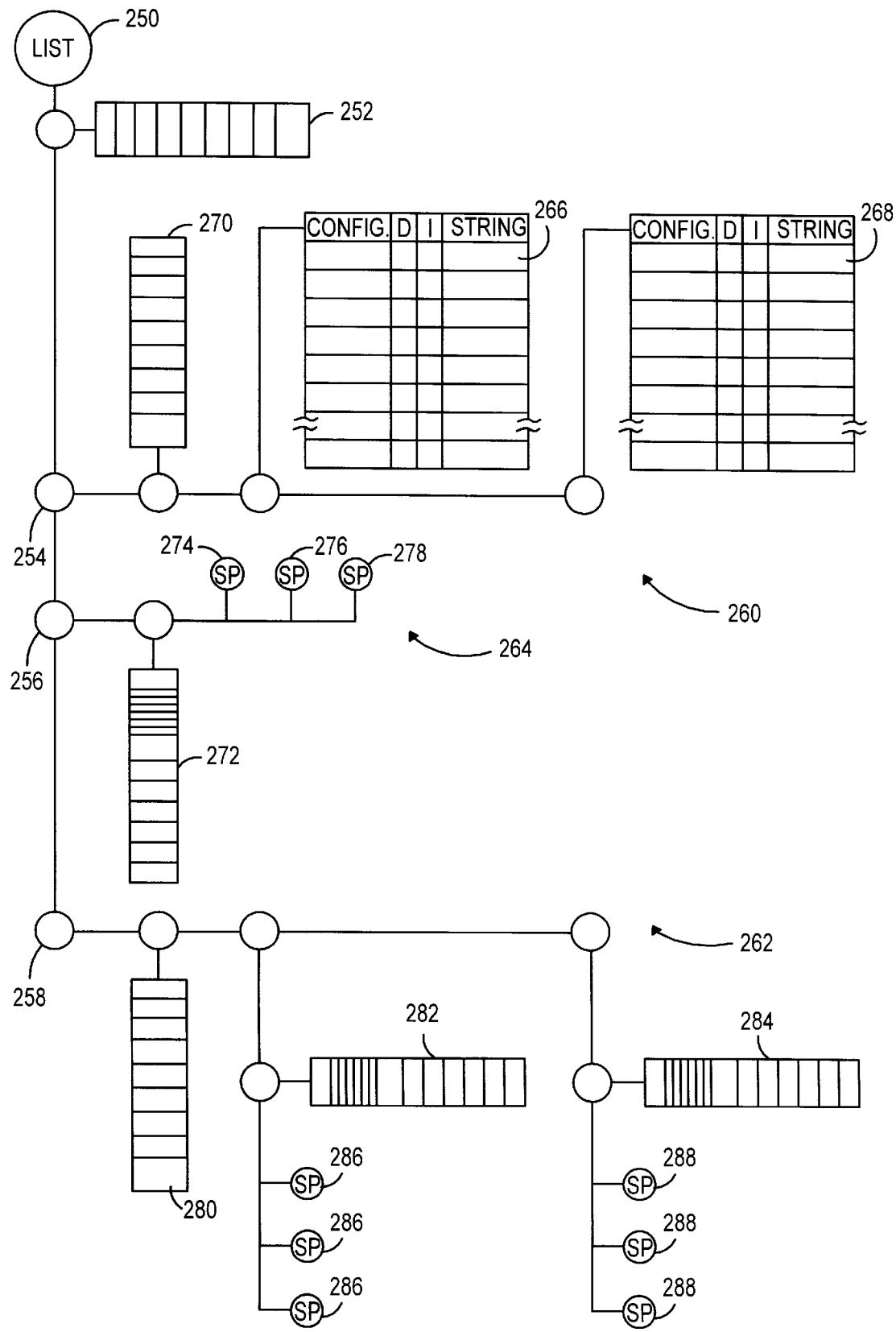
FIG. 9 is a schematical representation of a container object having an object vector sequence of Order One, an object list sequence of Order Zero and an object list sequence of Order One.

FIG. 9 illustrates a container of the vector and the list implementations. An object container sequence has a main list element 250 with a universal configuration stream 252 and three list elements 254, 256 and 258. The list elements 254 and 258 are for Order One sequences 260 and 262, while the list element 256 is related to an Order Zero sequence 264. The upper Order One sequence 260 includes a pair of vector row aggregates 266 and 268 and includes a global configuration stream 270. The structure and operation of this sequence is identical to the structure and operation described with reference to the vector implementation of FIG. 5. The Order Zero sequence 264 utilizes the list implementation and is structurally and operationally identical to the object list 10 of FIG. 1. The sequence 264 includes a local configuration stream 272 and three smart pointers 274, 276 and 278 to memory space having stored attribute values. The lower Order One sequence 262 has a global configuration stream 280 and a pair of Order Zero sequences having local configuration streams 282 and 284. Each of the two Order Zero sequences includes three smart pointers 286 and 288 to attribute values, but the number of smart pointers is not critical to the invention. While the three contained objects 260, 264 and 262 depict objects having identical attributes, it is mainly for the purpose of illustration. Typically, container objects contain objects with assorted types of attributes. Also, containers could have attributes of basic data types (integer, date, strings, etc.) in sequence with objects such as 260, 264 and 262.

The container sequence of FIG. 9 may be treated in the same manner as the uniform sequences described with reference to FIGS. 1–8. This ability to merge the vector and list implementations significantly enhances the power of the invention.

What is claimed is:

1. A system for data processing objects having a plurality of attributes in an object-based environment, comprising:

computer memory;

a global configuration stream having first configuration data indicative of a sequential arrangement of object lists, said global configuration stream being stored in said computer memory;

a plurality of said object lists accessible within said computer memory in an organization defined by said sequential arrangement, said sequential arrangement having a first object list and a last object list, said sequential arrangement further having intermediate object lists, each intermediate object list having data to provide an access link to an immediately preceding object list and an access link to an immediately following object list in said sequential arrangement, said access links forming a linked sequence of said object lists, each object list having data for identifying attribute values of an object associated with said each object list, each object being related to at least one attribute and at least one method, said global configuration stream including information indicative of types of said attributes for said objects associated with said object lists;

a local configuration stream for each of said object lists, said local configuration stream of a specific object list having second configuration data indicative of a data structure for attributes of an object associated with said specific object list; and a processor configured to access said object lists in a sequence based on said sequential arrangement indicated in said global configuration stream and to manipulate said objects at least partially based on said second configuration data of said local configuration streams;

wherein said object lists and said local configuration streams are stored to retain continued persistence between activations of a computer program which accesses said object lists and said local configuration streams.

2. The system of claim 1 wherein said global configuration stream includes an access link to said plurality of object lists.

3. The system of claim 1 further comprising a first order sequence list linked to said plurality of object links, said first order sequence list being linked to at least one other first order sequence list that is associated with a second plurality of object lists arranged in a sequence, each said second plurality being stored in said computer memory, each of said first order sequence lists having a separately stored global configuration stream, thereby defining a linked tree in which each said first order sequence list is a separate branch.

4. The system of claim 1 wherein said first configuration data of said global configuration stream includes list-accessing data, including list accessing data of a count of said object lists and an order of said object lists.

5. The system of claim 1 further comprising a memory pool in said computer memory, said memory pool having stored attribute values, each object list having a plurality of smart pointers identifying memory spaces in said memory pool for attribute values of an object associated with said each object list, wherein at least some of said smart pointers of a particular object list provide identification of memory spaces for access to attribute values of a single object such that there is a one-to-one correspondence between said object lists and objects associated with said sequence, said global configuration steam and said local configuration streams being stored in said memory pool in common with said object lists and said attribute values.

6. The system of claim 5 wherein each smart pointer includes an indicator of time-of-generation, said indicator of said smart pointer being utilized to determine validity of said attribute value at said identified location in said memory pool.

7. The system of claim 1 wherein each object list includes a vector configuration in a memory pool, said memory pool having stored attribute values representative of a plurality of said objects associated with said each object list, each object list having a one-to-one correspondence between said associated objects and local configuration streams.

8. The system of claim 1 wherein said second configuration data of said local configuration streams includes information related to a single object, said information including indications of an attribute count, attribute types, and attribute settings, said indications of attribute settings including identifications of whether specific attributes are variable by users of said system.

9. A method of processing objects for object-oriented programming comprising steps of:
  associating each of a plurality of objects with a separate local configuration stream having data indicative of attribute structure of said associated object, including forming each said local configuration stream to be indicative of the number and the types of attributes possessed by said associated object;
  associating each said local configuration stream with an object list, thereby associating each said object with one of said object lists;
  storing a sequence of said object lists in memory, including forming access links between each object list and an immediately following object list and forming access links between each object list and an immediately preceding object list of said each object list;
  associating said sequence with a global configuration stream having stored data indicative of positions of particular object lists in said sequence;
  utilizing said global configuration stream to process said object lists based on said access links, thereby accessing said local configuration streams;
  utilizing said local configuration streams to process said objects; and
  retaining integrity of said local configuration streams and said object lists between activations of said object-oriented programming for processing said objects.

10. The method of claim 9 further comprising a step of forming each local configuration stream to identify attribute states and types for the object associated with said each local configuration stream, said step of associating said objects being a step of forming a one-to-one correspondence between said objects and said local configuration streams.

11. The method of claim 9 further comprising a step of associating said sequence with a plurality of other sequences of object lists, including forming access links among said sequences to form a second order sequence.

12. The method of claim 9 further comprising a step of forming each object list to include a plurality of smart pointers, each smart pointer being a locator of memory space having an attribute value, said memory space being within said memory.

13. A system for data processing objects having a plurality of attributes in an object-based environment, comprising:
  a global configuration stream having first configuration data indicative of a sequential arrangement of object lists and types of attributes associated with said object lists;
  a plurality of said object lists accessible in an organization defined by said sequential arrangement, each object list having data for identifying attribute values of an object specifically associated with said each object list, each object being related to at least one attribute and at least one method;
  a local configuration stream for each of said object lists such that there is a one-to-one-to-one correspondence between said local configuration streams and said object lists and said objects, said local configuration stream of a specific object list having second configuration data indicative of a data structure for attributes of an object associated with said specific object list, said second configuration data of each local configuration stream being indicative of each of an attribute count, attribute types and attribute settings for all objects to which said each local configuration stream corresponds; and
  a processor configured to access said object lists in a sequence based on said sequential arrangement indicated in said global configuration stream and to manipulate said objects at least partially based on said second configuration data of said local configuration streams;
  wherein said global configuration stream, said object lists and said local configuration streams are stored to retain continued persistence between activations of computer programming for accessing said objects.

* * * * *